(12) United States Patent
Li et al.

(10) Patent No.: US 10,228,478 B2
(45) Date of Patent: Mar. 12, 2019

(54) METHOD OF SEARCHING FOR OIL-GAS RESERVOIR BASED ON TRAP-3D SOFTWARE

(71) Applicants: China National Petroleum Corporation, Beijing (CN); BGP Inc., China National Petroleum Corporation, Zhuozhou, Hebei (CN)

(72) Inventors: Qingzhong Li, Beijing (CN); Libin Zhang, Beijing (CN); Xiaomin Zhang, Beijing (CN)

(73) Assignees: CHINA NATIONAL PETROLEUM CORPORATION, Beijing (CN); BGP INC., CHINA NATIONAL PETROLEUM CORPORATION, Hebei (CN)

( * ) Notice: Subject to any disclaimer, the term of this patent is extended or adjusted under 35 U.S.C. 154(b) by 264 days.

(21) Appl. No.: 14/946,466

(22) Filed: Nov. 19, 2015

(65) Prior Publication Data

US 2016/0123121 A1 May 5, 2016

Related U.S. Application Data

(63) Continuation-in-part of application No. PCT/CN2015/077283, filed on Apr. 23, 2015.

(30) Foreign Application Priority Data

Nov. 5, 2014 (CN) .......................... 2014 1 0635467

(51) Int. Cl.
*E21B 43/00* (2006.01)
*G01V 1/30* (2006.01)
(Continued)

(52) U.S. Cl.
CPC .............. *G01V 1/302* (2013.01); *E21B 43/00* (2013.01); *G01V 1/30* (2013.01); *G01V 1/345* (2013.01); *G01V 1/50* (2013.01)

(58) Field of Classification Search
USPC .............................................. 702/6
See application file for complete search history.

(56) References Cited

U.S. PATENT DOCUMENTS 4,008,459 A 2/1977 Walker
5,018,112 A 5/1991 Pinkerton et al.
(Continued)

FOREIGN PATENT DOCUMENTS

CN 1138902 12/1996
CN 101299070 11/2008
(Continued)

OTHER PUBLICATIONS

First Office Action and search report dated Oct. 31, 2016 for counterpart Canadian patent application No. 2,912,626.
(Continued)

*Primary Examiner* — Paul D Lee
(74) *Attorney, Agent, or Firm* — Loza & Loza, LLP; Michael F. Fedrick

(57) ABSTRACT

The present invention provides a method of searching for an oil-gas reservoir based on TRAP-3D software, including: establishing a three-dimensional lithology and fault data cube of an exploration working area according to three-dimensional seismic data and logging data; dividing the three-dimensional lithology and fault data cube into several depth slices of the same thickness, and performing an individual sand body unit division for each depth slice; sequentially inputting the depth slices of the three-dimensional lithology and fault data cube into the TRAP-3D software for oil-gas reservoir evaluation. The present inven-
(Continued)

tion improves the accuracy of three-dimensional trap evaluation, is conducive to precise searching of the oil-gas reservoir, can plot a Sweet-Spot diagram on a plane, and get exhibits oil-gas trap amounts of different depths in a longitudinal direction, and can obtain a total trap amount of the oil gas reservoir in the exploration working area.

8 Claims, 10 Drawing Sheets

(51) Int. Cl.
 *G01V 1/34* (2006.01)
 *G01V 1/50* (2006.01)

(56) References Cited

U.S. PATENT DOCUMENTS

| | | | |
|---|---|---|---|
| 5,563,513 | A | 10/1996 | Tasci et al. |
| 5,563,949 | A | 10/1996 | Bahorich et al. |
| 6,473,696 | B1 * | 10/2002 | Onyia ............... G01V 1/32 702/14 |
| 2003/0004648 | A1 * | 1/2003 | Huffman ............ G01V 1/284 702/14 |
| 2010/0235154 | A1 * | 9/2010 | Meurer ............... G01V 11/00 703/10 |
| 2012/0158376 | A1 | 6/2012 | Freeman et al. |
| 2013/0064040 | A1 | 3/2013 | Imhof et al. |
| 2016/0123121 | A1 | 5/2016 | Li et al. |

FOREIGN PATENT DOCUMENTS

| | | |
|---|---|---|
| CN | 101915088 | 12/2010 |
| CN | 102369460 | 3/2012 |
| CN | 102918423 | 2/2013 |
| CN | 104375179 | 2/2015 |
| WO | 2014065891 | 5/2014 |
| WO | WO2016070587 A1 | 5/2016 |

OTHER PUBLICATIONS

Qayyum et al., "A modem approach to build 3D sequence Stratigraphic framework", Oil & Gas Journal, vol. 111 Issue 10, published on-line: Oct. 7, 2013.
International Search Report, International Patent Application No. PCT/CN2015/077283, dated Aug. 14, 2015.
Search Report dated Oct. 14, 2014 for counterpart Chinese Patent Application No. 201410635467.3.
Fu Fu Gong, "Method for interpreting small fault small entrapment small sand body by using three-dimensional seismic data and effect thereof," Geophysical Prospecting of Zhongyuan Petroleum Exploration Bureau, Collection of Abstracts for BISEG'89, Dec. 31, 1989, pp. 389-390.
Brenneke, James C., "Fault trap analysis," Tuha Oil and Gas, vol. 1, No. 3, Mar. 31, 1996.
Liang Liang Fu, "Research of Subtle Trap Identification Methods and Hydrocarbon Accumulation in Bayindulan Sag," Thesis, School of Geology Engineering, Yangtze University, Apr. 2013.
Canadian Patent Appln. No. 2,912,626, Office Action dated Jun. 7, 2017.
European Patent Appin. No. 15794444.8, Extended European Search Report dated May 30, 2018.
Zhang et al., Fault Trap Modelling and Calculation of Reserves, IPTC 16698, Mar. 26, 2013, pp. 1-9, XP055474841.
Qayyum et al., A Modern Approach to Build 3D Sequence Stratigraphic Framework, Oil& Gas Journal, Oct. 7, 2013, pp. 46-65, XP055475557.

* cited by examiner

Sweet-Spot plot

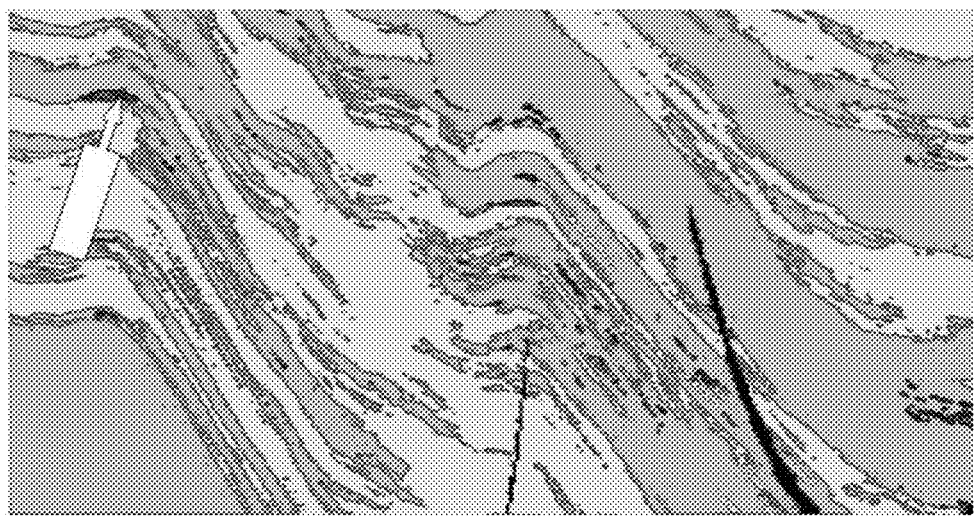
Fig. 14
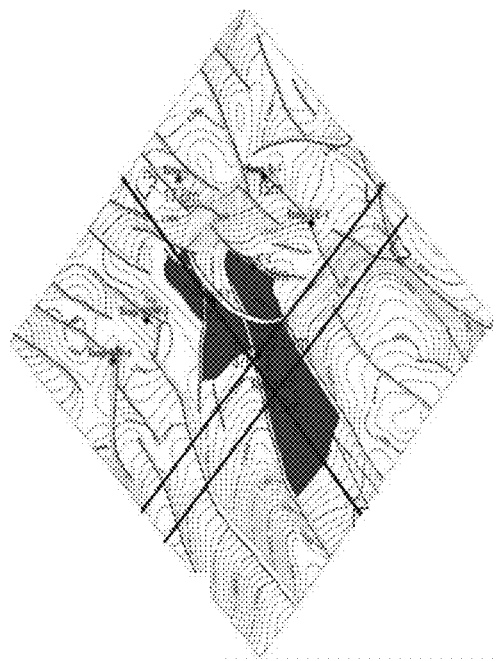 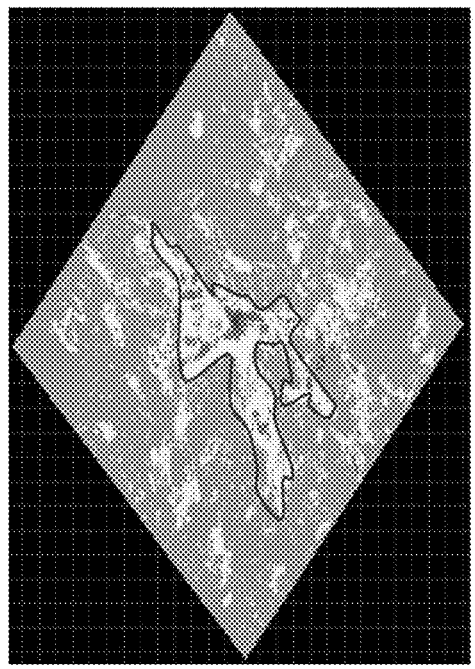
Fig. 15a                Fig. 15b

METHOD OF SEARCHING FOR OIL-GAS RESERVOIR BASED ON TRAP-3D SOFTWARE

CROSS-REFERENCE TO RELATED APPLICATIONS

This application is a continuation-in-part of International Patent Application No. PCT/CN2015/077283, filed on Apr. 23, 2015 and entitled METHOD OF SEARCHING FOR OIL-GAS RESERVOIR BASED ON TRAP-3D SOFTWARE, which claims the benefit of priority under 35 U.S.C. § 119 from Chinese Patent Application No 201410635467.3, filed on Nov. 5, 2014 and entitled METHOD OF SEARCHING FOR OIL-GAS RESERVOIR BASED ON TRAP-3D SOFTWARE. The contents of the foregoing applications are hereby incorporated by reference herein in their entirety.

TECHNICAL FIELD

The present invention relates to the technical field of oil-gas exploration, and particularly to a method of searching for oil-gas reservoir based on TRAP-3D software.

BACKGROUND

A place suitable for oil-gas accumulation and forming an oil-gas reservoir is called as a trap (or oil-gas trap). Currently, the trap concept is an important theory of searching for oil and gas. No oil or gas can exist if there is no trap. But for a long time, the structural trap is still mainly evaluated with the structural uplift amplitude and the structural area. However, it is difficult to quantitatively measure the actual trap amount just according to the above two indexes. As to the fault block trap, generally the trap area is only estimated according to the fault block area, while detailed studies on the key issue, i.e., whether the fault block has the trap condition are absent.

At present, commercial softwares for estimating the fault sealing ability, the structural spill point and the trap amount still stays in qualitative analysis or underground reservoir analysis based on two-dimensional data. The conventional method is to make an overlay diagram of sand-body structures on both sides of the fault on the two-dimensional profile, so as to determine the fault plane spill point of each sand layer, and find each sealing boundary point; and project those sealing boundary points to the structural contour plane and connect them with lines, so as to calculate the sealing area and the trap amount. However, when the above conventional method is used to evaluate the sealing ability of a complex fault block formed by many faults, it is very difficult to accurately analyze the sand layer communication in a two-dimensional space and the overall sealing condition just using the lithological two-dimensional butting profiles on both sides of a series of faults, thus an accurate result is hard to be obtained.

SUMMARY

The objective of the present invention is to provide a method of searching for oil-gas reservoir based on TRAP-3D software, so as to improve the accuracy of three-dimensional trap evaluation.

In order to achieve the above objective, the present invention provides a method of searching for an oil-gas reservoir based on TRAP-3D software, including:

establishing a three-dimensional lithology and fault data cube of an exploration working area according to three-dimensional seismic data and logging data;

dividing the three-dimensional lithology and fault data cube into several depth slices of the same thickness, and performing an individual sand body unit division for each depth slice;

sequentially inputting the depth slices of the three-dimensional lithology and fault data cube into the TRAP-3D software for oil-gas reservoir evaluation, wherein the step of sequentially inputting the depth slices of the three-dimensional lithology and fault data cube into the TRAP-3D software for the oil-gas reservoir evaluation specifically comprises:

performing a trap evaluation for respective individual sand body units in each depth slice layer by layer to obtain estimated trap amounts of the respective individual sand body units in each depth slice;

plotting a Sweet-Spot diagram on a plane according to the estimated trap amounts of the respective individual sand body units in each depth slice, exhibiting oil-gas trap amounts of different depths in a longitudinal direction, and obtaining a total estimated trap amount of reserved oil and gas in the exploration working area.

The present invention firstly combines the structural condition acquired from the three-dimensional seismic data with the underground lithological condition acquired from the logging data, and then adds with position information of the fault to synthetically form a data cube; secondly, divides the data cube into several depth slices of the same thickness, sequentially performs a trap evaluation for each depth slice, plots a Sweet-Spot diagram on a plane according to the estimated trap amount of the respective individual sand body units in each depth slice, exhibits oil-gas trap amount of different depths in a longitudinal direction, and obtains a total estimated trap amount of the oil gas reservoir in the exploration working area, so as to find various traps reserving oil and gases in the working area. Since the embodiment of the present invention divides the data cube into several depth slices of the same thickness, and sequentially performs a trap evaluation for each depth slice, the accuracy of three-dimensional trap evaluation is improved through the finer trap evaluation, which helps to accurately search for the oil-gas reservoir. In addition, the present invention can plot a Sweet-Spot diagram on a plane, exhibit oil-gas trap amount of different depths in a longitudinal direction, and can obtain a total trap amount of the oil gas reservoir in the exploration working area.

BRIEF DESCRIPTION OF THE DRAWINGS

The drawings described herein provide a further understanding of the present invention, and form a part of the present application rather than limitations to the present invention. In which.

FIG. 12a is a natural gamma-ray value diagram of a slice of a three-dimensional lithological data cube of the TN oil field according to an embodiment of the present invention;

FIGS. 12b and 13a are schematic diagrams of sand-mudstone lithology conversion calculated according to the natural gamma-ray values in FIG. 12a;

FIG. 13b is a schematic diagram of a slice after fault insertion in FIG. 13a;

FIG. 14 is a trap analysis profile of a vertical section of the TN oil field after a TRAP-3D software analysis according to an embodiment of the present invention;

FIG. 15a is a schematic diagram of an oil domain estimated for the TN oil field using conventional method for fault block oil field; this picture is merely a conceptual rough expression of oil-bearing area of fault block, without the meaning of trap quantity;

FIG. 15b is a schematic diagram of an oil domain after a TRAP-3D software processing for the TN oil field according to an embodiment of the present invention;

DETAILED DESCRIPTION

In order that the object, technical solutions and advantages of the present invention are clearer, the present invention will be further described in detail in conjunction with the embodiments and drawings. Herein, the exemplary embodiments of the present invention and descriptions thereof are used to make explanations to the present invention, rather than make limitations thereto.

The embodiments of the present invention are further described in detail in conjunction with the drawings.

Figure 1:
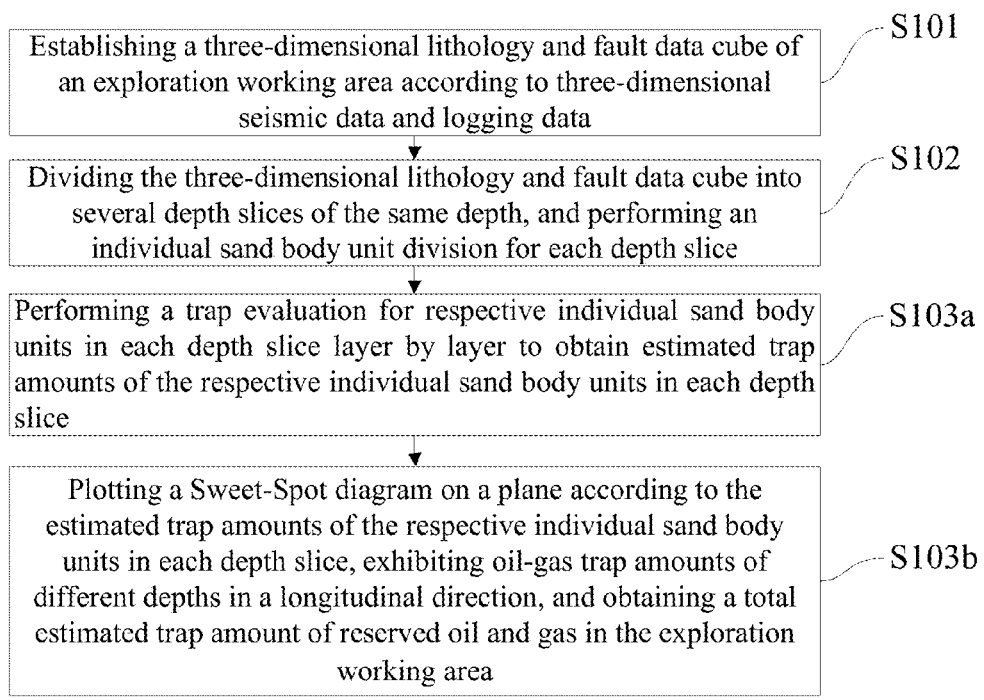
FIG. 1 is a flowchart of a method of searching for oil-gas reservoir based on TRAP-3D software according to an embodiment of the present invention.
Figure 2:
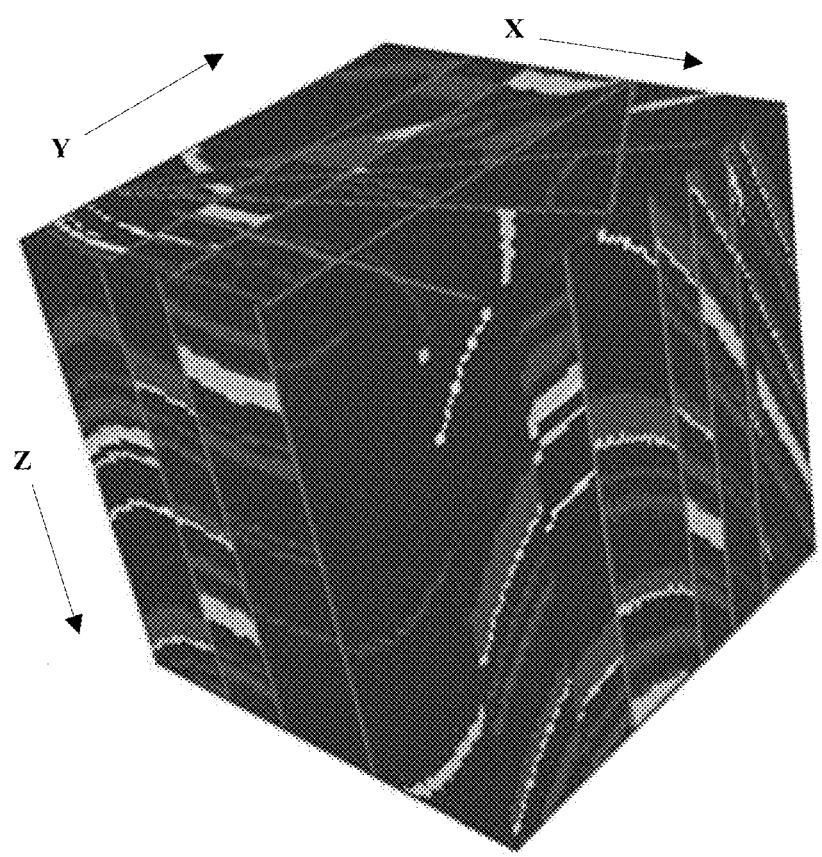
FIG. 2 is a schematic diagram of a three-dimensional lithology and fault data cube according to an embodiment of the present invention.
Figure 4:
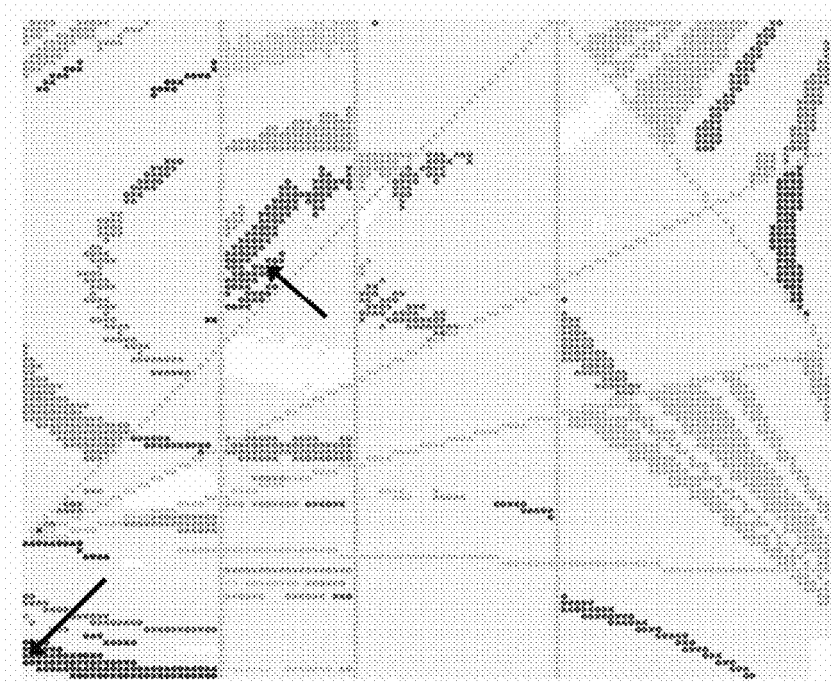
FIG. 4 is a division diagram of a sandstone linked unit of a depth slice according to an embodiment of the present invention.

As illustrated in FIG. 1, a reservoir evaluation method based on TRAP-3D software according to an embodiment of the present invention includes the steps of:

Step S101: establishing a three-dimensional lithology and fault data cube of an exploration working area according to three-dimensional seismic data and logging data. That is, structural information and fault information obtained from the three-dimensional seismic data are combined with lithological information obtained from the logging data to establish the three-dimensional lithology and fault data cube of the exploration working area. In which, the three-dimensional lithology and fault data cube is composed of four lithologies (mudstone, siltstone, medium sandstone and good sandstone) distinguished based on porosities, and distribution information of the fault plane in the three-dimensional equal interval mesh division space. The fault shall be a dense (having no vacant point) fault plane which is continuously distributed point by point in the the three-dimensional space equal interval division meshes. For example, corresponding characteristic indexes may be: the mudstone is denoted by 0, the siltstone is denoted by 1, the medium sandstone is denoted by 2, the good sandstone is denoted by 3, and the fault is denoted by 4, and it requires that each unit has an unique identifying mark (ID number), as shown in FIG. 4. Specifically, according to the project requirement, a lithological classification is performed for the chipped rocks in the working area on the basis of the established structural model and in conjunction with the logging curve (GR), the acoustic curve and the like. According to the interpretation result, the lithological filling of the structural model is performed in a manner of interwell interpolation, and the interpretation result of the sedimentary facies is taken as the boundary condition to make a phase controlled constraint to the model. A controlled interpolation is performed by using the logging data plus with the seismic data, and a lithology classification is made for the sand-mudstones in the working area according to the natural gamma-ray values. According to the GR values, a conversion into four lithology Indexes (i.e., good sandstone 3, medium sandstone 2, siltstone 1 and mudstone 0) is carried out. Finally, the established three-dimensional lithology and fault data cube is shown in FIG. 2. In which, TRAP-3D is a three-dimensional trap.

Step S102: dividing the three-dimensional lithology and fault data cube into several depth slices of the same thickness and performing an individual sand body unit division for each depth slice.

Figure 3:
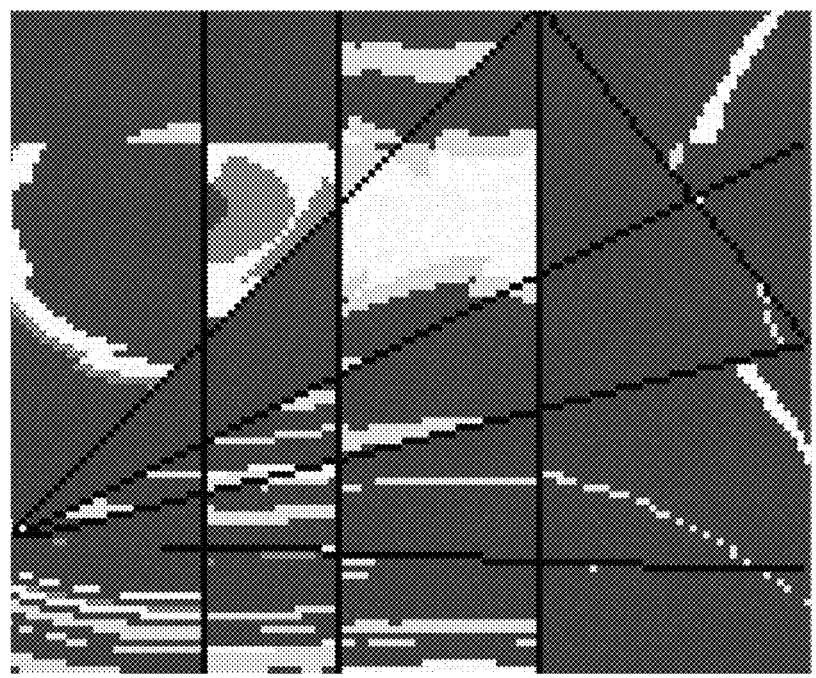
FIG. 3 is a schematic diagram of sand-mudstone lithologic division and fault distribution of a depth slice according to an embodiment of the present invention.

FIG. 3 illustrates a depth slice of a three-dimensional lithology and fault data cube, wherein its horizontal coordinate is in a horizontal direction X, and the vertical coordinate is in a horizontal direction Y. In which, the white color indicates good sandstone with a characteristic index 3; the light grey color indicates medium sandstone with a characteristic index 2; the dark grey color indicates siltstone with a characteristic index 1; the light black color indicates mudstone with a characteristic index 0; and the black color indicates fault with a characteristic index 4. This step of performing an individual sand body unit division for each depth slice specifically includes:

1) selecting a depth slice, and representing lithological information and fault information therein with corresponding characteristic indexes index;

2) searching for a sand point group composed of several sand points linked with each other in the depth slice according to a preset searching rule for interlinked sand points, wherein the boundary of each sand point group is defined by the mudstone and the fault; the preset searching rule for interlinked sand points is as follows:

as to a sand point not adjacent to the fault, searching for adjacent sand points linked with the sand point in eight directions (e.g., 0, 45, 90, 135, 180, 225, 270 and 315 degrees); and as to a sand point adjacent to the fault, searching for adjacent sand points linked with the sand point in four directions (e.g., 0, 90, 180 and 270 degrees);

3) merging the characteristic indexes index of all sand points in each sand point group into an individual sand body unit, and uniquely identifying each individual sand body unit by an unique ID. Trap evaluation calculation will based on these unique IDs;

4) repeating steps 1) to 3), until the individual sand body unit divisions for all the depth slices of the three-dimensional lithology and fault data cube are sequentially completed layer by layer.

Figure 6:
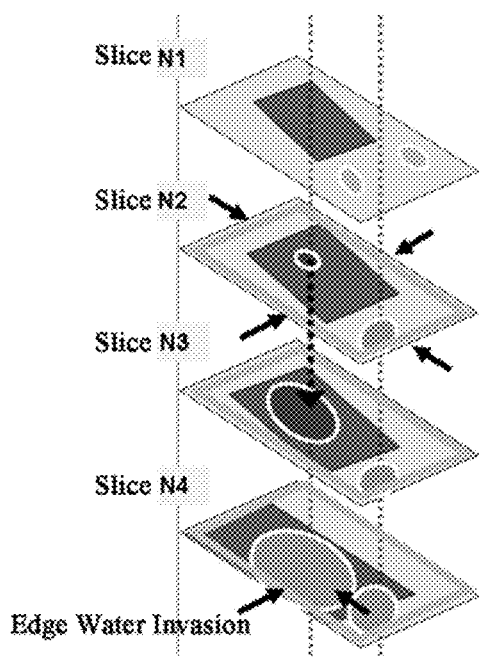
FIG. 6 is a schematic diagram of a trap evaluation method and an evaluation delivery method for each sand body unit in respective depth slices from top to bottom according to an embodiment of the present invention.

For example, it is assumed that the divided several depth slices of the same thickness are shown in FIG. 6.

a) Top slice N1 has a special circumstance (because it is the first slice and above slice N1 there is no evaluation control): if there are sand points in the drawing, a lowest evaluation MV=16 is given because it is unknown whether any mudstone is above;

b) in slice N2, a small sand point occurs in the mudstone and it is covered by the mudstone of N1 above, thus a highest evaluation MV=800 is given;

c) in slice N3, the small sand point changes into a big sand cake and it is linked to the above, thus the evaluation MV=800 of the sand point in N2 above is given to it;

d) in slice N4, the big sand cake continues expanding while connecting the edges, thus the edge water invades, the trap is destroyed, and the evaluation becomes the lowest, i.e., MV=16; if it is linked to the water bearing sand on the right, the MV will also decrease to the lowest.

Step S103a: performing a trap evaluation for respective individual sand body units in each depth slice layer by layer to obtain estimated trap amounts of respective individual sand body units in each depth slice. In which, step S103a specifically includes:

1) Selecting a depth slice, and updating initial trap evaluation values of the respective individual sand body units in the depth slice according to a trap evaluation update rule and lithology opposition situations on both sides of the fault in the depth slice, so as to obtain the final trap evaluation values of the respective individual sand body units in the depth slice, and assign the final trap evaluation values to respective sand points in corresponding individual sand body units, wherein the trap evaluation update rule is as follows:

if the opposite side of the fault is mudstone, adjusting the trap evaluation values of the respective individual sand body units according to different smearing and sealing effects of the mudstones of the respective individual sand body units in each depth slice;

if the opposite side of the fault is sandstone, when the trap evaluation value of the individual sand body unit on the side of the fault in each depth slice is higher than that of the individual sand body unit on the opposite side of the fault, the trap evaluation leakage value is calculated in the following equation:

$$LEAK = DDMV*(YXZH)/SEAL/4$$

wherein, LEAK is the trap evaluation leakage value, DDMV is the difference between the trap evaluation values of the individual sand body units on both sides of the fault, YXZH is a sum of lithologic indexes of the trap evaluation values of the individual sand body units on both sides of the fault, SEAL is the leakage coefficient and assigned by the user, e.g., when SEAL=5, it means leaking to the same as the opposite side after encountering 5 sands of the opposite side.

Figure 7:
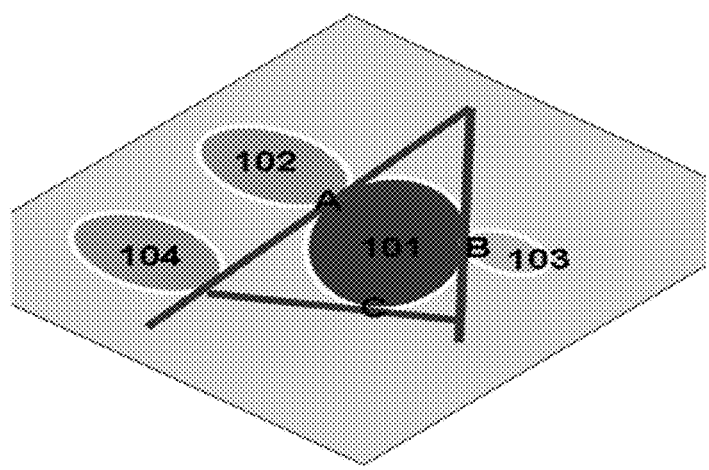
FIG. 7 is a schematic diagram of a calculation method of a fault leakage amount according to an embodiment of the present invention.

For example, as shown in FIG. 7, the fine sand layer 101 encounters faults at three places A, B and C, the fault at place C is opposite to mudstone, the fault at place B is opposite to siltstone, and the fault at place A is opposite to good sandstone, thus an update may be made according to the above trap evaluation update rule.

2) Obtaining an estimated trap amount of the depth slice according to the equation $SS_j = \text{Sum}\{index_i * MV_i\}$, wherein $SS_j$ is the estimated trap amount of the $j^{th}$ depth slice, $index_i$ is the void volume of the $i^{th}$ individual sand body unit of the $j^{th}$ depth slice, and $MV_i$ is the final trap evaluation value of the $i^{th}$ individual sand body unit of the $j^{th}$ depth slice.

3) Repeating steps 1)-2) until the estimated trap amounts of all the depth slices in the three-dimensional lithology and fault data cube are sequentially obtained layer by layer.

Figure 5:
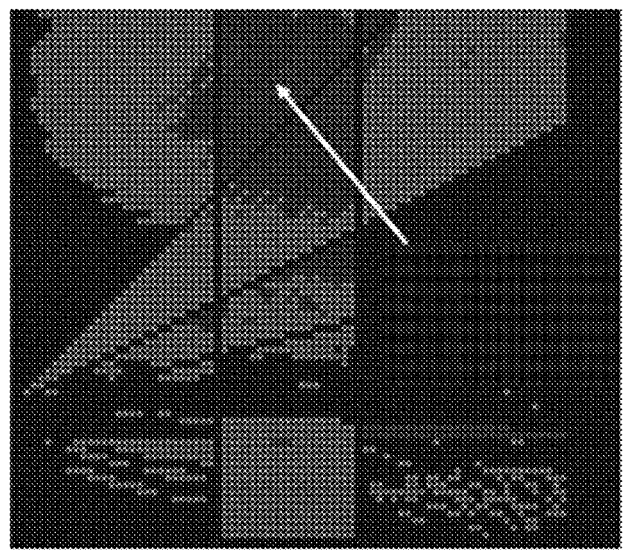
FIG. 5 is a Sweet-Spot plot according to an embodiment of the present invention.

Step S103b: plotting a Sweet-Spot diagram on a plane according to the estimated trap amount of the respective individual sand body units in each depth slice, exhibiting oil-gas trap amount of different depths in a longitudinal direction, and obtaining a total estimated trap amount of the reserved oil and gas in the exploration working area. The estimated trap amount of each depth slice is accumulated in the direction of depth Z, and then a total trap amount of the plane is plotted, as shown in FIG. 5, which reflects the accumulated trap amount underground at each point location in the working area plane. From FIG. 5, it can be seen that the oil-gas bearing possibility increases with the trap amount on the plane, which may be a reference for making decisions on arrangement of the exploration wells.

Steps S103a-S103b are the process of sequentially inputting the depth slices of the three-dimensional lithology and fault data cube into the TRAP-3D software for oil-gas reservoir evaluation. In addition, in the embodiment of the present invention, before performing the trap evaluation for respective individual sand body units in each depth slice layer by layer, the method further includes:

setting an initial trap evaluation value for the respective individual sand body units in each depth slice, and in this process, the method further includes:

when a sand point in a certain individual sand body unit of a current depth slice is linked with a sand point in a certain individual sand body unit of the depth slice on its adjacent upper layer, the certain individual sand body unit of the current depth slice directly inherits the initial trap evaluation value of the certain individual sand body unit of the depth slice on the adjacent upper layer.

Figure 8:
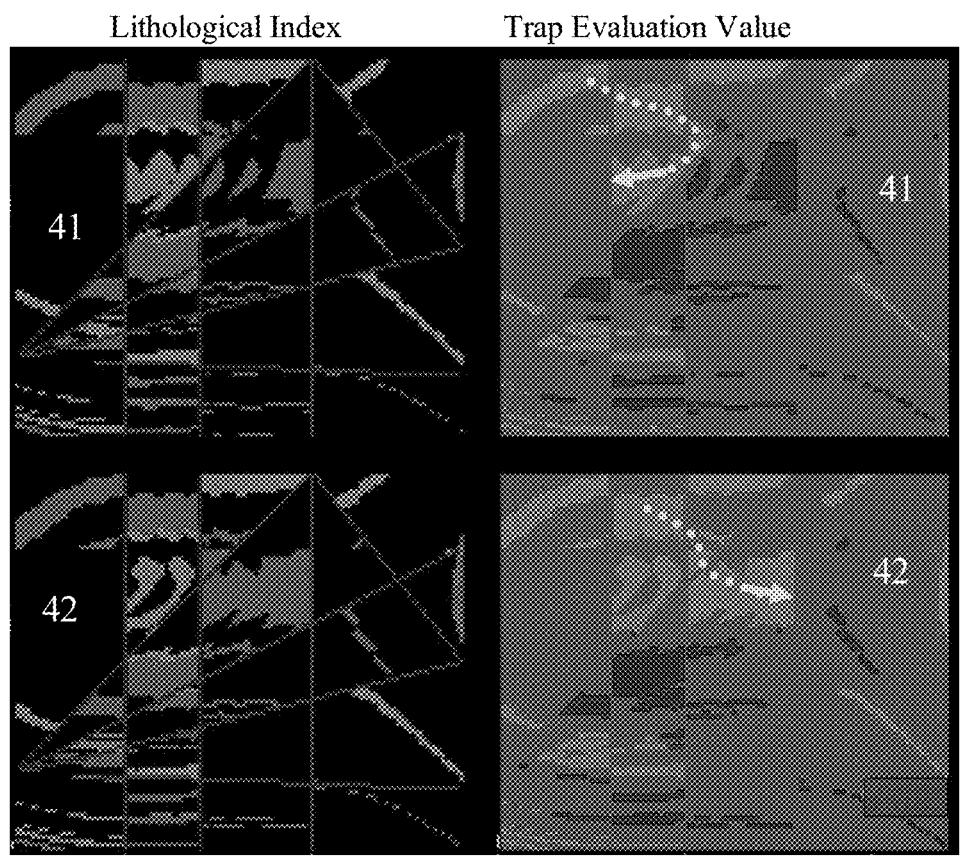
FIG. 8 is a schematic diagram of a change of trap evaluations of two adjacent slices before and after a processing with TRAP-3D software according to an embodiment of the present invention.

In the embodiment of the present invention, as shown in FIG. 8, two adjacent slices 41 and 42 are assumed. The left parts of FIG. 8 show sand-mudstone distributions of lithologic indexes of adjacent slices 41 and 42, respectively, and the right parts of FIG. 8 are trap evaluation value views of the slices 41 and 42 after a trap analysis through TRAP-3D software. As can be seen from the two drawings at the right, due to the edge water invasion and the mutual contact between the sandstores on both sides of the fault, the trap evaluation value gradually decreases. The locuses are indicated by the arrows, wherein the white arrows indicate the path in which edge water invades the trap through linked fault to decrease the trap evaluation value.

The sealed oil domain of the slice 42 is less than that of the slice 41.

Figure 9:
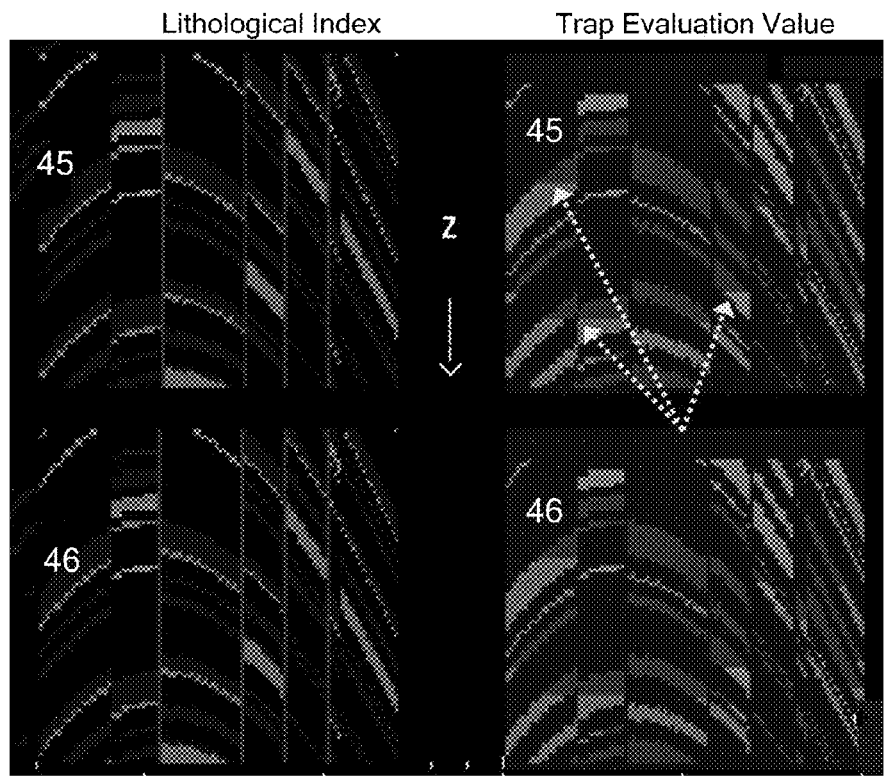
FIG. 9 is a schematic diagram of a change of trap evaluations of another two adjacent vertical sections before and after a processing with TRAP-3D software according to an embodiment of the present invention.

In the embodiment of the present invention, as shown in FIG. 9, it is assumed that two adjacent slices 45 and 46 are two adjacent slices of a complex fault block which has complex lithological distributions. The left parts of FIG. 9 show sand-mudstone distributions of lithologic indexes of adjacent slices 45 and 46, respectively, and the right parts of FIG. 9 are trap evaluation value views of the slices 45 and 46 after a trap analysis through TRAP-3D software. It can be seen therefrom the oil water distribution situation in each sand layer (the shallow bright color indicates water). In which, the white color indicates a water containing area with a very low trap evaluation, and the arrow indicates an oil water interface.

Figure 10:
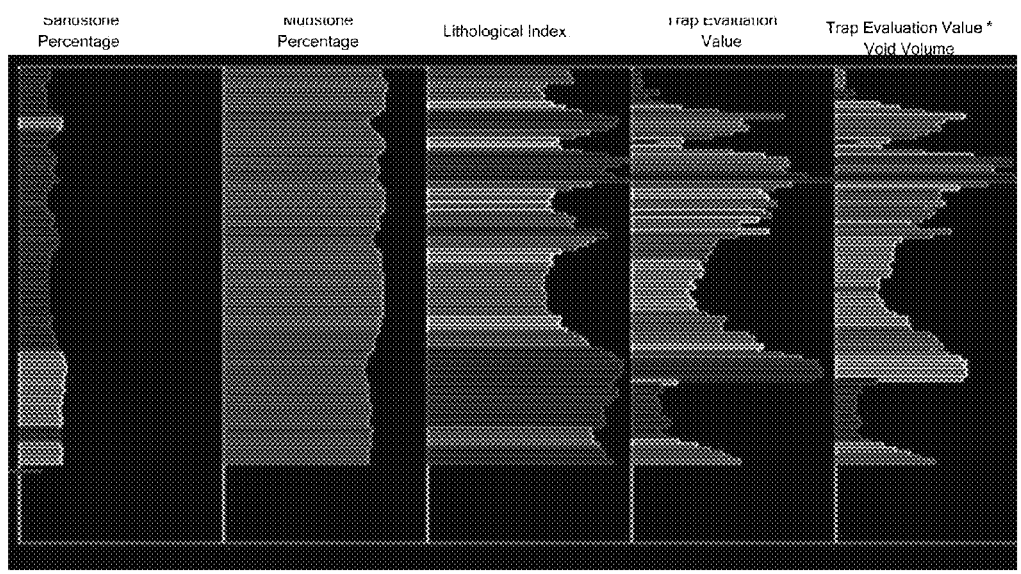
FIG. 10 is a schematic diagram of five curves outputted after a trap evaluation is finished in a depth domain according to an embodiment of the present invention.

In addition, in the embodiment of the present invention, the sand-mudstone percentage of each depth slice and the comparison diagram of trap amounts of respective depth slices can also be plotted in the depth domain, as shown in FIG. 10. Thus, the depth and the stratum where the trap volume is the maximum can be seen more intuitively.

Figures 11A, 11B:
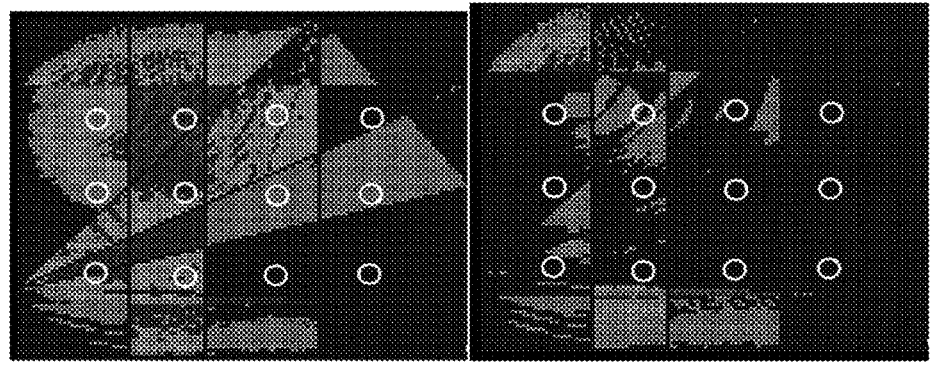
FIG. 11a is a schematic diagram of reserve distribution before uniformly drilling 12 oil wells in a certain working area according to an embodiment of the present invention.
FIG. 11b is a schematic diagram of remaining reserve distribution after uniformly drilling 12 oil wells in a certain working area and finishing the oil and gas exploitation according to an embodiment of the present invention.

In the embodiment of the present invention, FIGS. 11a and 11b are schematic diagrams of reserve distributions before and after drilling 12 wells and unused reserve distributions. In the working area of the complex fault block model, 12 wells are drilled uniformly, and in each well, oil extraction is completely carried out in the encountered oil layer. As a result, "dead oil areas" where oil cannot be extracted and "remaining oil" not encountered by the 12 wells are left. As can be seen from FIG. 11b, many unused reserves are still available for development. Those unused reserves can also be calculated with TRAP-3D software.

The embodiment of the present invention is described by taking TN oil field as an example:

TN oil field is a complex fault block oil field. Herein the study area is about 54 km², and the depth of the oil-bearing series is about 1 to 2 km. In the working area, 8 wells have been drilled and a few thin oil layers are found. Herein the slice analysis depth is 1300 m to 1850 m.

In order to provide the input data format required by the TRAP-3D software, a three-dimensional lithology and fault data cube needs to be prepared. Sand layer interpolations are performed under the well control conditions of logging data of 8 wells, and fault data of seismic interpretation is added to form a three-dimensional lithology and fault data cube. It is assumed that each unit point in the three-dimensional lithology and fault data cube has a size of 18 m*18 m*1 m, and an analysis is performed in the depth direction by taking a slice per meter.

Figures 12A, 12B:
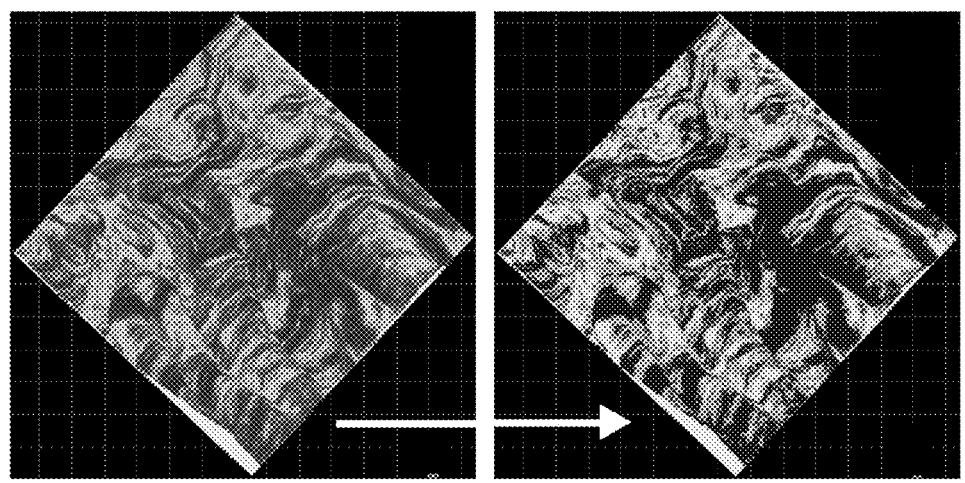
Figure 13A:
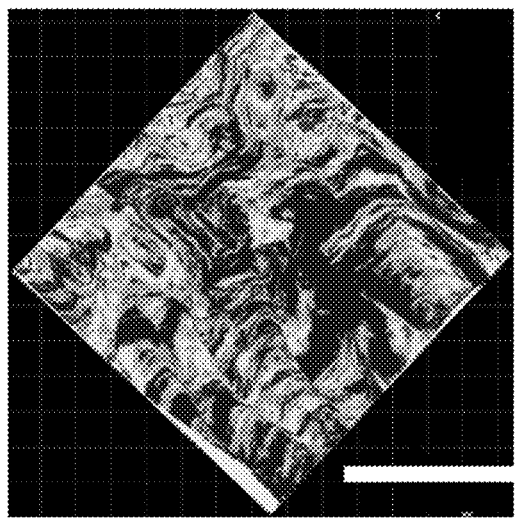

(i) According to the project requirement, a lithological classification is performed for the chipped rocks in the working area on the basis of the established structural model and in conjunction with the logging curve (GR), the acoustic curve and the like. According to the interpretation result, the lithological filling of the structural model is performed in a manner of interwell interpolation, and the interpretation result of the sedimentary facies is taken as the boundary condition to make a phase controlled constraint to the model. A controlled interpolation is performed by using the logging data plus with the seismic data, and a lithology classification is made for the sand-mudstones in the working area according to the natural gamma-ray values. FIG. 12a is a colorful diagram of natural gamma-ray (GR) values of a certain slice in the TN oil field. According to the GR values, a conversion into four lithologies (i.e., good sandstone 3, sandstone 2, siltstone 1 and mudstone 0) is carried out. FIGS. 12b and 13a are conversion diagrams of the natural gamma-ray values.

Next, fault data interpreted from the seismic data is fused into those slices.

Figure 13B:
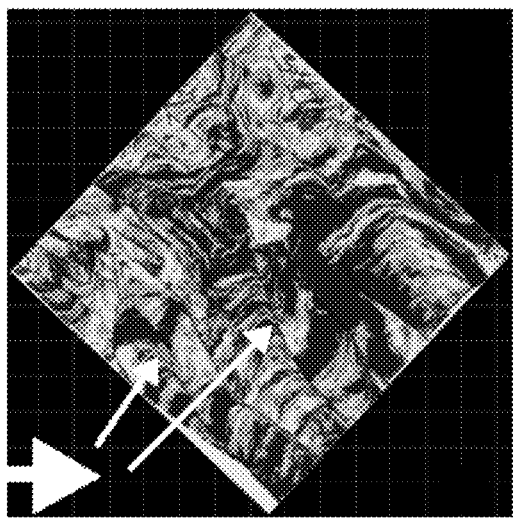

Fine fault interpretations are made to the three-dimensional seismic data with a general method for seismic data interpretation, fault files are exported from the interpreted fault data, and XYZ coordinates of each fault point are inserted into the interpreted three-dimensional lithology and fault data cube. Each fault point is marked with a lithologic index 4. FIG. 13b shows four distributions of the sand-mudstone classification, and the right part shows the situation after the insertion of faults (black fine lines). FIG. 13b meets the input requirement of TRAP-3D program.

After the above works are done for each slice, data preparation of the whole three-dimensional lithology and fault data cube is finished, and the data input requirement suitable for TRAP-3D software analysis is completed.

(ii) TRAP-3D trial computation result of actual TN oil field data

As shown in FIG. 14, as to a depth profile processed by TRAP-3D software, it can be seen that although the sand layer is developed, only a few places have traps. In FIG. 14, several stripped black lines at the lower right are faults, other dark black parts are lithological traps. The left part of FIG. 14 has an anticline structural trap as indicated by an arrow. In which, the gray parts are mudstones; the black parts, except two vertical black lines which are faults, are all structural and lithological traps bearing oil and gases, and the white parts are water bearing sandstones.

FIG. 15a shows an oil domain over-estimated for the TN oil field in a conventional method for fault block oil field. As shown in FIG. 15b, an oil domain of the TN oil field processed with the TRAP-3D software substantially coincides with the over-estimated oil domain. It is clear that the TRAP-3D software in the present application has a more quantitative concept, and it includes many lithological traps and small anticline structural traps on the north.

Figure 16:
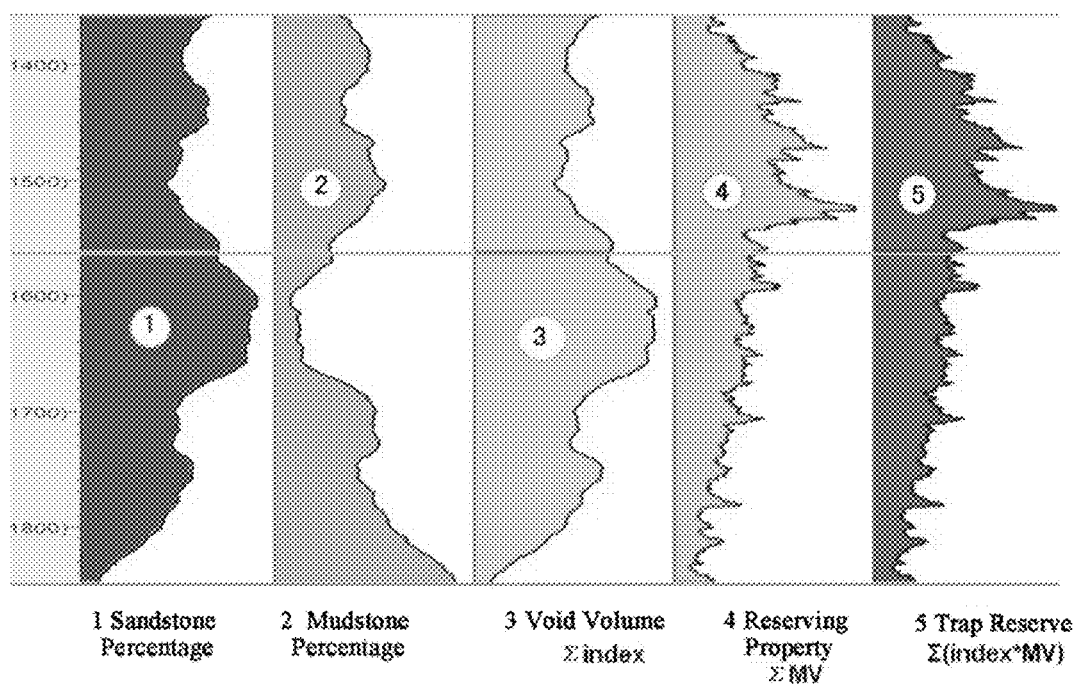
FIG. 16 is a schematic diagram of five statistical curves outputted according to an evaluation result of a depth domain for the TN oil field according to an embodiment of the present invention.

FIG. 16 shows the sand-mudstone percentages (curves 1 and 2) in respective slices of the same thickness which are counted based on depth and calculated by the TRAP-3D software, void volumes (curve 3) of respective slices calculated according to Sum{index}, Sum{MV} which represents the reserving property (curve 4), and the rightmost curve 5 which indicates the trap amount SS=Sum{index*MV} in the depth slice. In FIG. 16, although the sandstone percentage is up to 60% at a depth of 1630 m, the trap amount is not large. As can be seen from the curves 4 and 5, the trap amount is large at the depth from 1420 to 1520 m although the sandstone is not so much. The actual exploitation also proves that it is exactly the main production layer of the oil field. It is clear that the TRAP-3D software gives a better quantitative result.

(iii) The final calculation result of the trap reserve of the TN oil field is as follows:

1) basis data: an average porosity of 28.5%, an average oil saturation of 70%, a sandstone percentage of 47.3%, a mudstone percentage of 52.7%, and a middle body trap area of about 10.5 km².

2) the total trap reserve in the study range is SSS (i.e., all the slices are added together).

$$SSS=\Sigma[\text{Sum}\{index*MV\}]\times\text{average porosity}*\text{cuboid unit volume}/800$$

Calculation result of TRAP-3D software: the total trap reserve in the study range is about 0.53×108 m³.

The embodiments of the present invention firstly combines the structural condition acquired from the three-dimensional seismic data with the underground lithological condition acquired from the logging data, plus with position information of the fault to synthetically form a data cube; secondly, performs equi-depth division on the data cube to divide the data cube into several depth slices of the same thickness, and sequentially performs a trap evaluation for each depth slice, so as to find various traps reserving oil and gases in the working area. Since the embodiments of the present invention divides the data cube into several depth slices of the same thickness and sequentially performs a trap evaluation for each depth slice, the accuracy of three-dimensional trap evaluation is improved through the finer trap evaluation.

The above embodiments give further and detailed descriptions of the objective, technical solutions and beneficial effects of the present invention. It shall be appreciated that the above descriptions just concern specific embodiments of the present invention rather than restricting the protection scope of the present invention. Any amendment, equivalent replacement and improvement made within the spirit and principle of the present invention shall fall within the protection scope of the present invention.

What is claimed is:

1. A method of searching for an oil-gas reservoir based on TRAP-3D software, comprising:
    establishing a three-dimensional lithology and fault data cube of an exploration working area according to three-dimensional seismic data and logging data;
    dividing the three-dimensional lithology and fault data cube into several depth slices of the same thickness, and performing an individual sand body unit division for each depth slice;
    sequentially inputting the depth slices of the three-dimensional lithology and fault data cube into the TRAP-3D software for oil-gas reservoir evaluation,
    wherein the step of sequentially inputting the depth slices of the three-dimensional lithology and fault data cube into the TRAP-3D software for the oil-gas reservoir evaluation specifically comprises:
    performing a trap evaluation automatically with a computer for respective individual sand body units in each depth slice layer by layer to obtain estimated trap amounts of the respective individual sand body units in each depth slice;
    performing the following steps with a computer: plotting a Sweet-Spot diagram on a plane according to the estimated trap amounts of the respective individual sand body units in each depth slice; exhibiting oil-gas trap amounts of different depths in a longitudinal direction; and obtaining a total estimated trap amount of reserved oil and gas in the exploration working area, so as to find various traps of oil and gases in the exploration working area with improved accuracy, and provide a reference for drilling an oil well in the exploration working area based on the oil-gas reservoir evaluation; and
    drilling an oil well in the exploration working area based on the oil-gas reservoir evaluation.

2. The method according to claim 1, wherein the step of establishing the three-dimensional lithology and fault data cube of the exploration working area according to the three-dimensional seismic data and logging data specifically comprises:
    establishing the three-dimensional lithology and fault data cube of the exploration working area by combining structural information and fault information obtained from the three-dimensional seismic data with lithological information obtained from the logging data.

3. The method according to claim 1, wherein the step of performing the individual sand body unit division for each depth slice specifically comprises:
    1) selecting a depth slice, and representing lithological information and fault information therein with corresponding characteristic indexes;
    2) searching for all sand point groups composed of several sand points linked with each other in the depth slice according to preset searching rules for interlinked sand points, wherein a boundary of each sand point group is defined by mudstone and a fault;
    3) merging the characteristic indexes of all sand points in each sand point group to serve as an individual sand body unit, and uniquely identifying each individual sand body unit;
    4) repeating steps 1) to 3), until the individual sand body unit divisions for all the depth slices of the three-dimensional lithology and fault data cube are sequentially completed layer by layer.

4. The method according to claim 3, wherein the preset searching rules for interlinked sand points comprises:
    as to a sand point not adjacent to the fault, searching for adjacent sand points linked with the sand point in eight directions; and
    as to a sand point adjacent to the fault, searching for adjacent sand points linked with the sand point in four directions.

5. The method according to claim 1, wherein before performing the trap evaluation for respective individual sand body units in each depth slice layer by layer, the method further comprises:
    setting an initial trap evaluation value for the respective individual sand body units in each depth slice.

6. The method according to claim 5, wherein in the process of setting the initial trap evaluation value for the respective individual sand body units in each depth slice, the method further comprises:
    if there exists an upper and lower connection relation between a sand point in a certain individual sand body unit of a current depth slice and a sand point in a certain individual sand body unit of the depth slice on its adjacent upper layer, the certain individual sand body unit of the current depth slice directly inherits the initial trap evaluation value of the certain individual sand body unit of the depth slice on the adjacent upper layer.

7. The method according to claim 5, wherein the step of performing the trap evaluation for respective individual sand body units in each depth slice layer by layer to obtain estimated trap amounts of respective individual sand body units in each depth slice specifically comprises:
    1) selecting a depth slice, and updating initial trap evaluation values of the respective individual sand body units in the depth slice according to a trap evaluation update rule and lithology opposition situations on both sides of a fault in the depth slice, so as to obtain the final trap evaluation values of the respective individual sand body units in the depth slice, and give the final trap evaluation values to respective sand points in corresponding individual sand body units;
    2) obtaining an estimated trap amount of the depth slice according to the equation $SS_j=\text{Sum}\{index_i * MV_i\}$, wherein $SS_j$ is the estimated trap amount of the $j^{th}$ depth slice, $index_i$ is a void volume of the $i^{th}$ individual sand body unit of the $j^{th}$ depth slice, and $MV_i$ is the final trap evaluation value of the $i^{th}$ individual sand body unit of the $j^{th}$ depth slice; and
    3) repeating steps 1)-2) until the estimated trap amount of all the depth slices in the three-dimensional lithology and fault data cube are sequentially obtained layer by layer.

8. The method according to claim 7, wherein the trap evaluation update rule comprises:
    if an opposite side of the fault is mudstone, adjusting the trap evaluation values of the respective individual sand body units according to different smearing and sealing effects of the mudstone of the respective individual sand body units in each depth slice;

if an opposite side of the fault is sandstone, when the trap evaluation value of the individual sand body unit on the side of the fault in each depth slice is higher than that of the individual sand body unit on the opposite side of the fault, a trap evaluation leakage value is calculated in the following equation:

$$LEAK = DDMV * (YXZH)/SEAL/4$$

wherein, LEAK is the trap evaluation leakage value, DDMV is a difference between the trap evaluation values of the individual sand body units on both sides of the fault, YXZH is a sum of lithologic indexes of the trap evaluation values of the individual sand body units on both sides of the fault, and SEAL is a leakage coefficient.

* * * * *